United States Patent
Tomooka et al.

(10) Patent No.: US 6,877,106 B2
(45) Date of Patent: Apr. 5, 2005

(54) IMAGE DISPLAY METHOD, IMAGE DISPLAY SYSTEM, HOST DEVICE, IMAGE DISPLAY DEVICE AND DISPLAY INTERFACE

(75) Inventors: Takatoshi Tomooka, Kanagawa-ken (JP); Johji Mamiya, Kanagawa-ken (JP); Kazushi Yamauchi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 09/725,972

(22) Filed: Nov. 29, 2000

(65) Prior Publication Data
US 2001/0038387 A1 Nov. 8, 2001

(30) Foreign Application Priority Data
Nov. 30, 1999 (JP) .......................................... 11-341462

(51) Int. Cl.[7] .............................................. G06F 11/00
(52) U.S. Cl. ............................... 714/4; 714/46; 714/18; 710/33; 345/204
(58) Field of Search ............................... 714/4, 18, 46, 714/748; 710/31, 33; 345/204, 501–506, 519, 520, 530, 574, 344

(56) References Cited

U.S. PATENT DOCUMENTS

| | | | | |
|---|---|---|---|---|
| 5,262,965 A | * | 11/1993 | Putnam et al. ................ | 358/1.1 |
| 5,680,322 A | * | 10/1997 | Shinoda ........................ | 714/18 |
| 5,880,702 A | * | 3/1999 | Morimoto et al. ........... | 345/1.1 |
| 6,014,765 A | * | 1/2000 | Maeda et al. ................ | 714/748 |
| 6,032,180 A | * | 2/2000 | Nishikawa ................... | 725/115 |
| 6,088,045 A | * | 7/2000 | Lumelsky et al. ........... | 345/531 |
| 6,128,015 A | * | 10/2000 | Zenda ......................... | 345/474 |
| 6,327,254 B1 | * | 12/2001 | Chuah ......................... | 370/328 |
| 6,418,549 B1 | * | 7/2002 | Ramchandran et al. ..... | 714/811 |
| 6,570,679 B2 | * | 5/2003 | Saruwatari ................... | 358/468 |
| 6,597,363 B1 | * | 7/2003 | Duluk et al. ................ | 345/506 |
| 2002/0089517 A1 | * | 7/2002 | Ludtke et al. .............. | 345/629 |
| 2004/0017398 A1 | * | 1/2004 | MacInnis et al. ........... | 345/781 |

* cited by examiner

*Primary Examiner*—Robert Beausoliel
*Assistant Examiner*—Yolanda L Wilson
(74) *Attorney, Agent, or Firm*—Robert M. Trepp; F. Chau & Associates, LLC

(57) ABSTRACT

To achieve a transfer of image data of large capacity from a host system side to a display side and a transfer of a far small quantity of data from the display side to the host system side with the maximum efficiency.

An image display method which transfers image data between a host system side executing an application and a display side displaying an image, which includes the steps of: managing image data by the host system side, which belongs to a window in accordance with a sub-area obtained by dividing a display area of the display side, the window that is a region making sense in an image space of which the application is conscious; transferring the image data as a unit of a packet to the display side via the digital I/F; developing the image data transferred in a panel memory of the display side; grasping conditions concerning a transfer error in a unit of a window; and grasping the conditions of the transfer error through a signal line by the host system side.

19 Claims, 12 Drawing Sheets

IMAGE DISPLAY METHOD, IMAGE DISPLAY SYSTEM, HOST DEVICE, IMAGE DISPLAY DEVICE AND DISPLAY INTERFACE

BACKGROUND OF THE INVENTION

1. Field of the Invention

The present invention relates to a video interface for displaying an image on a display panel, more particularly to a system and method for driving display and high definition panels by distributed processing.

2. Related Art

A display image is generally processed by a graphics controller of a host device, for example a personal computer (PC) or the like, and sent to a display device. However, progress in display devices, such as, for example, a recent liquid crystal display (LCD) panel, has resulted in differences in processing capabilities between the host device and the display device. For example, referring to LCD panels, the definition of a panel has been increased, and high-resolution (ultra high-resolution) panels with very high pixel count have been put into practical use. In comparison with the resolution of prior panels, such as 1024×768 dots in XGA (eXtended Graphics Array), 1280×1024 dots in SXGA (Super eXtended Graphics Array), 1400×1050 dots in SXGA+ and 1600×1200 dots in UXGA (Ultra eXtended Graphics Array), the pixel count of the panels coming into practical use has increased greatly, for example, to 2048× 1536 dots in QXGA (Quad eXtended Graphics Array), 2560×2048 dots in QSXGA (Quad Super eXtended Graphics Array) and 3200×2400 dots in QUXGA (Quad Ultra eXtended Graphics Array). These high-resolution, or ultra high-resolution, panels far exceed CRTs in definition. However, the power of the typical host system and graphics controller is not sufficient to keep up with the progress of panel technology and therefore the high-resolution panels cannot realize their potential definition. Performance of an image processing system as typified by a graphics controller is at most QXGA (2048×1536 dots) in terms of a general display function. For three dimensional (3D) computer graphics (CG) as typified by home video game machines, the performance of the image processing system shows a processing capability of merely a low pixel count of about 640×480 dots in VGA (Video Graphics Array). As described above, while the most advanced moving pictures still show a VGA grade pixel count, the panels that now can be manufactured show a pixel count several or several tens of times as high as that of the moving pictures. The disparity in processing capability has increased significantly.

Display devices as typified by the LCD panel have much smaller frames than ever, which are located around its display portion; and so-called tiling that makes panels up into a large panel, has been made possible. As a result, it is possible to further increase the pixel count of the display devices as well as the ultra high-resolution panels, and the difference in the processing capability between the host system and the display is even more significant.

Furthermore, in an attempt to keep the frame rate constant on the display panel side, when display video data transmitted from a host system (host side) is displayed on an ultra high-resolution display panel, as the grade of high resolution increases, the transfer rate on the video interface must be made greater. On the other hand, with reference to the video interface between the host system and the display system, instead of conventional analog interfaces, so-called digital interfaces such as LVDS (Low Voltage Differential Signaling), TMDS (Transition Minimized Differential Signaling) and GVIF (Gigabit Video InterFace) have been introduced. These use a digital data transmission system which operates at a low voltage. Therefore, increases in these transfer rates can be achieved by increasing the frequency of transfer clocks of the digital interface, and by doubling (Dual Channel) and quadrupling (Quadruple Channel) the number of signal lines of the video interface.

However, in the above-described way, every time a new ultra high-resolution display panel emerges, a transfer rate that the new panel needs must be realized. To be more specific, a new video interface timing must be defined, LSIs coping with a high transfer clock rate must be newly expanded and a new multi-channel structure must be adopted for the video interface signals. Then, the above must be added to Video Interface Standard such as VESA (Video Electronics Standard Association). Infrastructure for effectively promoting these new expansions, and for introducing new standards, is now almost never ready, and this is the main impediment to the spread of display systems using the ultra high-resolution display panels, in spite of the near-future demands for the ultra high-resolution display panels. As long as a video interface is newly expanded according to conventional interface extension techniques, these problems will persist. To solve these problems thoroughly, a video interface based on a different concept from that of the conventional video interface must be devised.

SUMMARY OF THE INVENTION

The present invention was made to solve the above described problems. The object of the present invention is to achieve a transfer of image data with large capacity from a host system to a display and a transfer of data with far small capacity from the display to the host system with a maximum efficiency.

Another object of the present invention is to make it possible to process a transfer error in transferring image data and to reduce the quantity of data transfer relating to the transfer error.

An image displaying method of the present invention, which transfers image data between a host system for executing an application and a display connected to the host system for displaying an image via an interface, includes:

managing image data by the host system, which image data belongs to a window in accordance with a sub-area obtained by dividing a display area of the display, the window being a region which makes sense in an image space of which the application is conscious;

transferring the image data managed by the host system as a packet unit to the display via the interface;

developing the image data, which is transferred to the display via the interface, in a panel memory of the display;

grasping conditions concerning a transfer error in the transferred image data in a unit of the window; and grasping by the host system the conditions grasped by the display.

According to the image displaying method of the present invention, a re-transfer of the image data from the host system to the display through the interface can be executed based on the conditions of the transfer error grasped by the host system. With such constitution, in the case where the image data is not transferred from the host system to the display for every refreshment of the display, but the refreshment is executed based on the image data developed in the panel memory, it is still possible to repair and display image data including transfer errors.

If the re-transfer of image data is executed for all sub areas belonging to the window, and the image data is developed in the panel memory only for a sub area in which the transfer error occurred, the quantity of information to be output from the display to the host system can be reduced.

On the other hand, if the re-transfer of the image data is executed for a sub area in which the transfer error is grasped, the quantity of re-transferred image data can be reduced.

An image display system according the present invention includes:

a host system for executing an application;
a display connected to the host system; and
an interface for connecting the host system and the display to each other, the interface including
a first interface for executing a large capacity transfer of image data from the host system to the display and
a second interface for executing a small capacity transfer of data from the display to the host system, small capacity meaning not zero but far smaller than the quantity of image data transferred by the first interface.

Here, large capacity data transfer is about 100 M BPS to 1 G BPS (Byte/Sec) supported with, for example, SXGA, 8 bits/color and a 60 Hz refresh rate. Small capacity data transfer is at most about 1.2K BPS to 1.8K BPS (Byte/Sec). The ratio of the former transfer rate to the latter is about 100,000:1 to 1,000,000:1. The first interface transfers data after packetizing it, and the second interface transfers data for use in error handling for the data through the first interface. The host system transfers the image data through the first interface before development. The display includes a panel memory for developing the image data transferred through the first interface, and transfers information for transfer errors, which occurred in the image data developed in the panel memory, through the second interface.

The first interface can be constituted by a uni-directional high speed transfer line, and the second interface may be constituted by a bi-directional low speed transfer line.

On the other hand, the second interface can be physically constituted by use of a part of the first interface. This constitution results in the advantage that a bi-directional low speed transfer line such as DDC (Display Data Channel) need not be provided.

Furthermore, the first interface may be constituted by a bi-directional high speed transfer line, and may transfer the image data in synchronization with high-speed clock signals obtained by multiplying clock signals, while the second interface may transfer the data in synchronization with clock signals which are not multiplied to the bi-directional high speed transfer line used for the first interface. With such constitution, a multiply circuit used in transferring the data by the second interface can be omitted.

A host device of the present invention connected to a display for displaying an image through an interface, includes:

a system bus for receiving image data from an application to be executed; and
a transfer unit adapted
to divide the image data received through the system bus so that each of the divided image data corresponds to corresponding one of sub areas obtained by parceling a display area of the display, and
to transfer the packetized image data in units of the divided image for each sub area, to the display.

The system bus receives the image data in accordance with a window that is a region making sense as a block in an image space of which the application is conscious, and the transfer means transfers the image data to the display so that each of the divided image data corresponds to corresponding one of the sub areas belonging to the window.

A host device of the present invention which executes an application and is connected to a display for displaying an image through an interface, includes:

image data transfer means for transferring image data to the display after packetizing the image data into a unit so as to correspond to a predetermined area obtained by parceling a window that is a display area making sense as a block in an image space of which the application is conscious; and
error condition receiving means for receiving error conditions with reference to the image data transferred to the display by the image data transfer means, in the form of a predetermined unit from the display.

As a style of the host device, a host device which is constructed by inserting an optional card into a PC is considered. Moreover, the host device may be constituted by a semiconductor chip. It is also possible to achieve the function of the host device in terms of software by rewriting a program on the PC.

The predetermined unit, with which the error condition receiving means receives the error conditions, may be a unit of a window developed by the display. With such constitution of the host device, the quantity of information can be significantly lessened compared to a case where the error information is transferred in a unit of packet.

The image transfer means may re-transfer the image data based on the error conditions received by the error condition receiving means. To be more specific, there is a style in which a state of a panel completion bit (later described) and a state of a pointer register (later described) on the display side are observed, thus deciding an occurrence of errors. In addition to the style in which the existence of re-transfer is decided, there are a style in which only a packet causing a transfer error is transferred, and a style in which all packets are re-transferred for every window.

An image display device of the present invention includes:

a panel for displaying an image;
at least one receiver adapted to receive image data through a high-capacity interface from a host system which executes an application; and
notifying means for notifying the host system of information indicating a transfer error with respect to the image data received by the receiving means through a much lower-capacity interface than the first high-capacity interface.

The notifying means includes the one in which the host system reads the notifying information depending on its demand.

The image display device further includes a panel memory for developing the image data received by the receiving means, and the developed image data in the panel memory is used for panel refreshing, and the notifying means notifies the host system of the transfer error information in a unit for each panel refreshing.

The notifying means may notify the host system of information indicating the transfer error when a still picture is displayed in the panel, and may not notify the host system of the information indicating the transfer error when a moving picture is displayed in the panel. With such constitution, it is possible to cope with still pictures in which the image data needs not to be transferred from the panel to the display every refreshment, separately from moving pictures.

The image display device of the present invention includes:

a panel for displaying an image;

at least one receiver adapted to receive image data packetized from a host system which executes an application;

a panel memory for developing the image data received by the receiver; and transfer error notifying means for recognizing a transfer error with respect to the image data received by the receiver; and for notifying the host system of information relating to the transfer error, the transfer error being recognized in a unit of developed image data in the panel memory.

The transfer error notifying means further includes an identification information storing section for storing identification information of the image data which caused the transfer error and notifies the host system of the identification information stored in the identification information storing section. Thus, it is possible to recognize from the host system side which packet caused the transfer error. For example, the image display device of the present invention can be constituted so that only the packet which caused the transfer error is re-transferred.

To be more specific, the identification information storing section has error address registers for identifying a packet received and a pointer register indicating the number of the error address registers.

On the other hand, conceiving of the present invention as a display interface, the display interface, which transfers image data from a host system for executing an application to a display for executing an image display, includes:

variable-length packet data for transferring image data obtained by dividing an image space of which the application is conscious, in a predetermined unit, and by packetizing the divided image data; and control lines for indicating a valid packet period in the variable-length packet data.

Here, the control line need not be physically separated from a line for transferring the packet data. In other words, the control line is constituted by use of an enable signal including predetermined bits in the interface which transfers the packet data. For example, it is possible to indicate a valid packet period by using one bit among 30 bits in the interface.

For another point of view, the present invention is conceived as a display interface which transfers image data to a display for each sub area belonging to a window, the image data being transferred after making the image data have a packet structure and the window being a region making sense in a block in an image space of which an application is conscious, and the packet structure includes:

a header portion including information indicating to which window the packet belongs;

a body portion including image data belonging to the sub area for the display and information relating to an address of the sub area; and a footer portion including information for confirming a transfer error.

The header portion may include information for identifying whether the packet is re-transferred for re-transferring the image data. Accordingly, the re-transfer processing can be executed on the display side based on the information of the header portion. Besides this, the header portion may include information indicating the moving picture and information indicating that data is rewritten on the host system side. Moreover, information indicating a scaling factor and information indicating a position of the window, can be added to the body portion.

The footer portion has a bit array for confirming a transfer error. Accordingly, the transfer error can be grasped on the display side.

BRIEF DESCRIPTION OF THE DRAWINGS

For a more complete understanding of the present invention and the advantages thereof, reference is now made to the following description taken in conjunction with the accompanying drawings.

DESCRIPTION OF THE PREFERRED EMBODIMENTS

Embodiments of the present invention will be described with reference to the accompanying drawings below.

Figure 1:
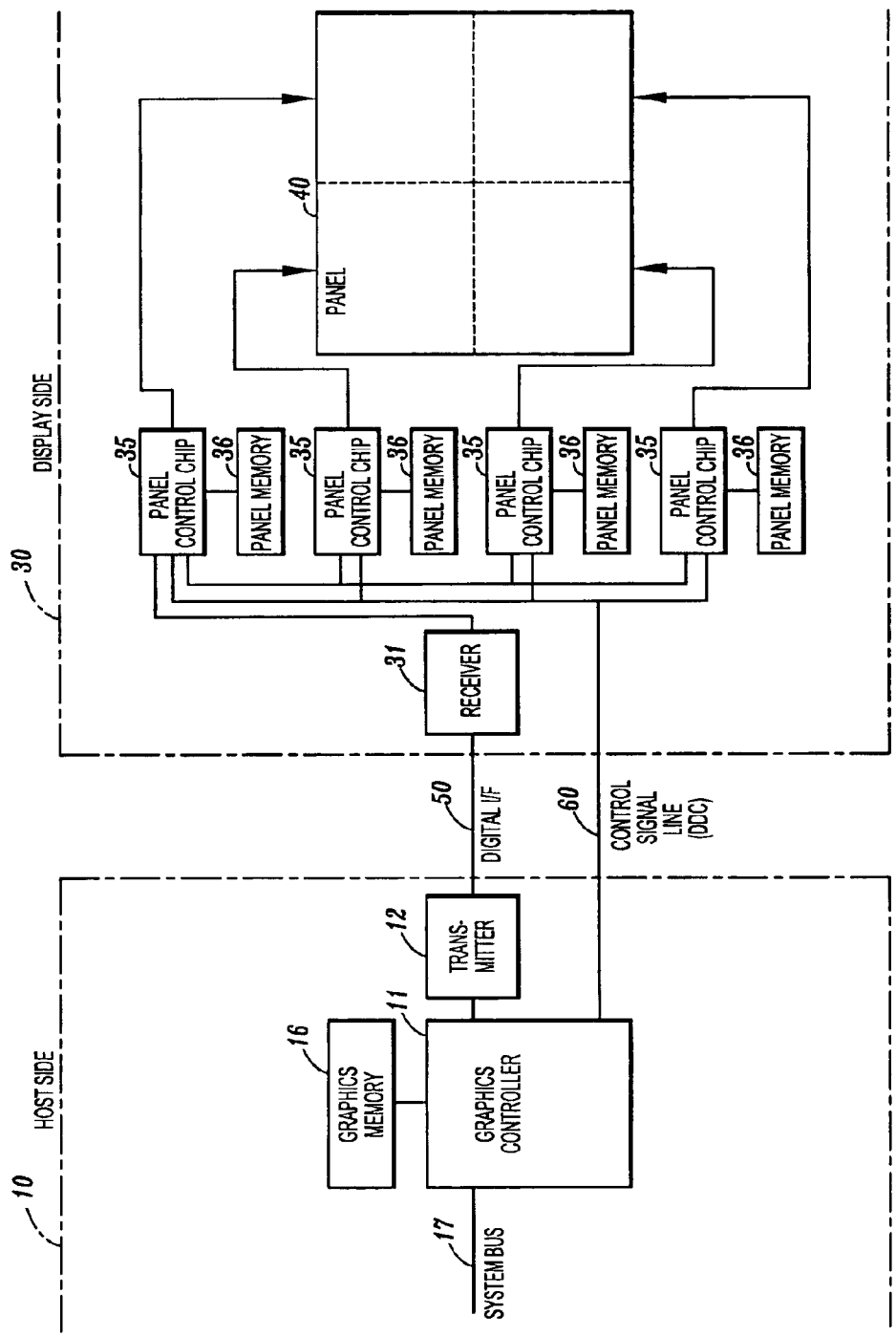
FIG. 1 is a block diagram showing an embodiment of an image display system according to the present invention.

FIG. 1 is a block diagram showing an embodiment of an image display system to which the present invention is applied. Referring to FIG. 1, reference numeral 10 denotes a host system side including, for example, a personal computer (PC), which serves as a driving apparatus for driving a display device in this embodiment. In the host system side 10, reference numeral 11 denotes a graphics controller, which executes pre-processing of image data by a pre-processor (not shown) built therein. Reference numeral 16 denotes a graphics memory, which is used for the pre-processing of the image data. In this embodiment, by eliminating the need for refreshing using the graphics controller 11 owing to the distributed processing, the graphics memory 16 is constructed with a smaller capacity compared with conventional ones. Reference numeral 17 denotes a system bus connected to a host system (not shown) for executing an application. Reference numeral 12 denotes a transmitter, which transfers image data from the graphics controller 11 to a display side 30. Reference numeral 50 denotes a digital interface (hereinafter referred to as digital I/F), which is LVDS or TMDS for transferring the image data from the host system side 10 to the display side 30. The digital I/F 50 is positioned as a uni-directional differential-type video interface exhibiting a high speed operation. Reference numeral 60 denotes a control signal line, which is a bi-directional transfer line exhibiting a low speed operation, which is, for example, DDC (Display Data Channel). The control signal line 60 connects a DDC handler (not shown) provided in the graphics controller 11 with a later-described DDC controller (not shown) provided in a panel control chip on the display side 30.

On the other hand, on the display side 30, reference numeral 35 denotes a panel control chip having a host processor (not shown) therein. Panel control chips 35 are provided (four in FIG. 1) in accordance with the number of the division of a panel 40 which actually displays an image. Reference numeral 36 denotes a panel memory provided for each panel control chip 35. Reference numeral 31 denotes a receiver, which converts the image data transferred thereto via the digital I/F 50 and transfers it to each panel control chip 35. Furthermore, reference numeral 40 denotes the panel which actually displays the image. In FIG. 1, the panel 40 is divided into four areas and controlled. The panel 40 is constituted by a high-resolution panel, and, in order to support this high-resolution screen, each panel control chip 35 is capable of performing parallel-processing.

A feature of this embodiment is that pre-processing of data is executed by the graphics chip 11, and a post-processing of the data is executed by the panel control chip 35. With such constitution of this embodiment, a job for generating an image in the host system side 10 such as mixing image data and refreshing a screen, is executed on the display device (display side 30). In other words, a tag, an attribute and an error protection are attached to the image data before the image data is developed by the graphics chip 11; that is, before the image data is mixed, and the image data is developed to the panel memory 36; that is, the image data is decoded and mixed with other image data for the first time by the panel control chip 35. Then, the image data is transferred to a refreshing circuit (not shown).

Figure 12:
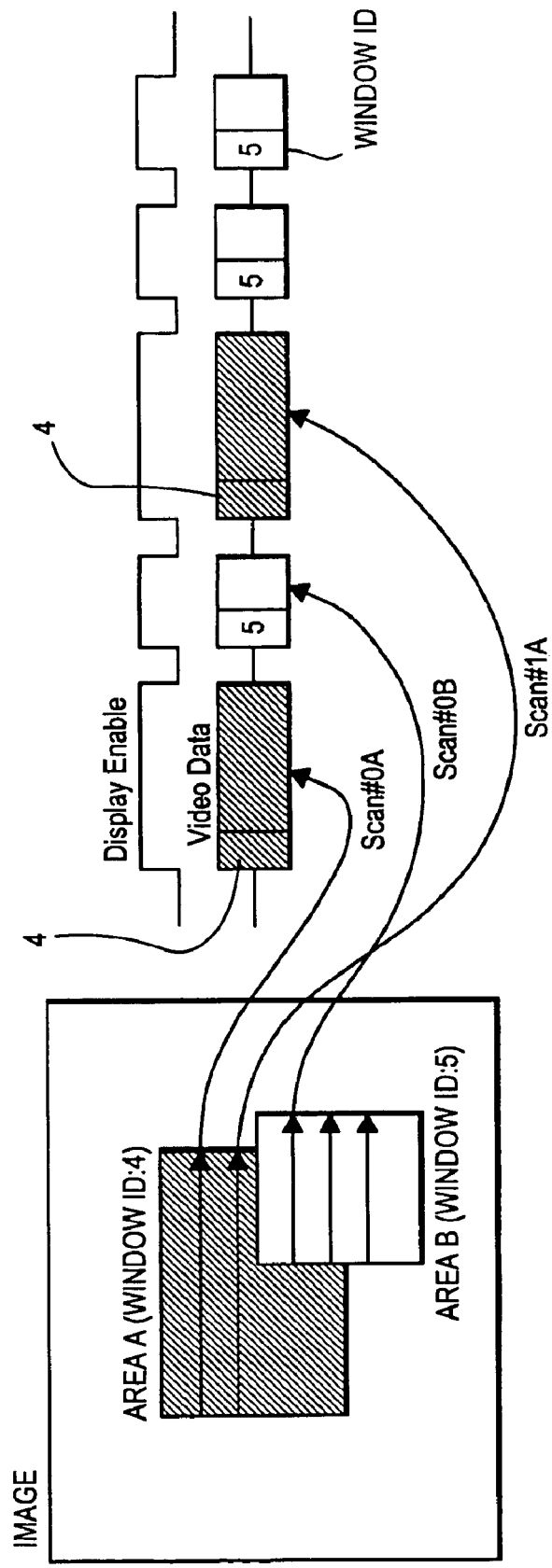
FIG. 12 is an illustrative view of a transfer method of image data using the packets, in relation to the foregoing window areas.

In one embodiment, the concept of a window is introduced. A window is an area making sense in a block on an image space of which a host system is conscious, and a unit employed for a transfer processing of image data. FIG. 12 is an illustrative view for briefly explaining an example of a method for transferring image data by a packet used in this embodiment, with reference to the above-described window. It is assumed that an area A and area B exist as images displayed by an application on a host system. In this embodiment, a developing operation of the image is not executed on the host system side 10, but on the display side 30. On the host system side 10, a window ID: 4 and a window ID: 5 are set for the area A and the area B, respectively. Image information is divided for each area and transferred to the display side 30 in the form of a packet. To be more specific, the image information is packetized for each area unit, which belongs, for example, to a sub-area for each scan (described below) corresponding to a display enable signal, and then image signals are transferred to the display side 30. This sub-area may be a rectangular area including a predetermined number of pixels. The image signals packetized are added with ID information indicating a window ID and then transferred. For example, if the window ID:4 and the window ID:5 are set to each handler (not shown) in a specific sub-panel, the image information transferred in the form of a packet and added with the window ID, can be developed on a designated sub-panel.

Bus protocol itself has been widely adopted for transferring the data in the form of packets. A serial bus standard defined by IEEE1394 standard is an example. This serial bus standard connects between two PCs or among peripheral equipment using two sets of twisted pairs of differential signal lines and executes bi-directional transfer of the packet data in a half duplex communication mode, in which data transfer is performed only from one node in the same time zone. Two nodes are connected generally in a cascade style or in a tree style, and a network extending over nodes is constructed, thus enabling data transfer from each node to other nodes.

However, since packet transfer according to IEEE1394 assumes that an interface transfers data with an even quantity in each direction, an average transfer rate in a certain direction cannot be increased to a physical maximum of a bus. For example, bus arbitration is always necessary before beginning the transfer. Moreover, in asynchronous subaction which is a typical transfer mode of IEEE1394, a certain bus master which acquired a bus transfers asynchronous packet to a bus target that is a slave, and then its acknowledge packet must be read back after a certain period of time. For this reason, an average data transfer rate from the same bus master is lowered.

On the other hand, in an isochronous subaction that is another transfer mode, after a bus arbitration is performed, the bus master never reads back an acknowledge packet after sending out a synchronous packet. However, since the bus master cannot read back any acknowledge packet, a later-described error situation cannot be grasped.

When transfer of video data from a PC on the host system side 10 to the display side 30 or a group of display panels connected to each other, is considered, the quantity of the data transferred from the host system side 10 to the display side 30 is large. On the other hand, a quantity of data transferred from the display side 30 to the host system side 10 (data read from the host system side 10) is small compared to the data transferred from the host system side 10 to the display side 30 because only display ID information and transfer error information are transferred. However, the quantity of data transferred from the display 30 to the host system side 10 cannot be zero.

In this embodiment, in order to cope with such problems, an effective interface for transferring data in the form of a packet is provided, which is capable of realizing a large quantity of data transferred from the host system side 10 to the display side 30 and enabling data transfer from the display side 30 to the host system side 10 though the quantity of data transfer is small.

Figure 2:
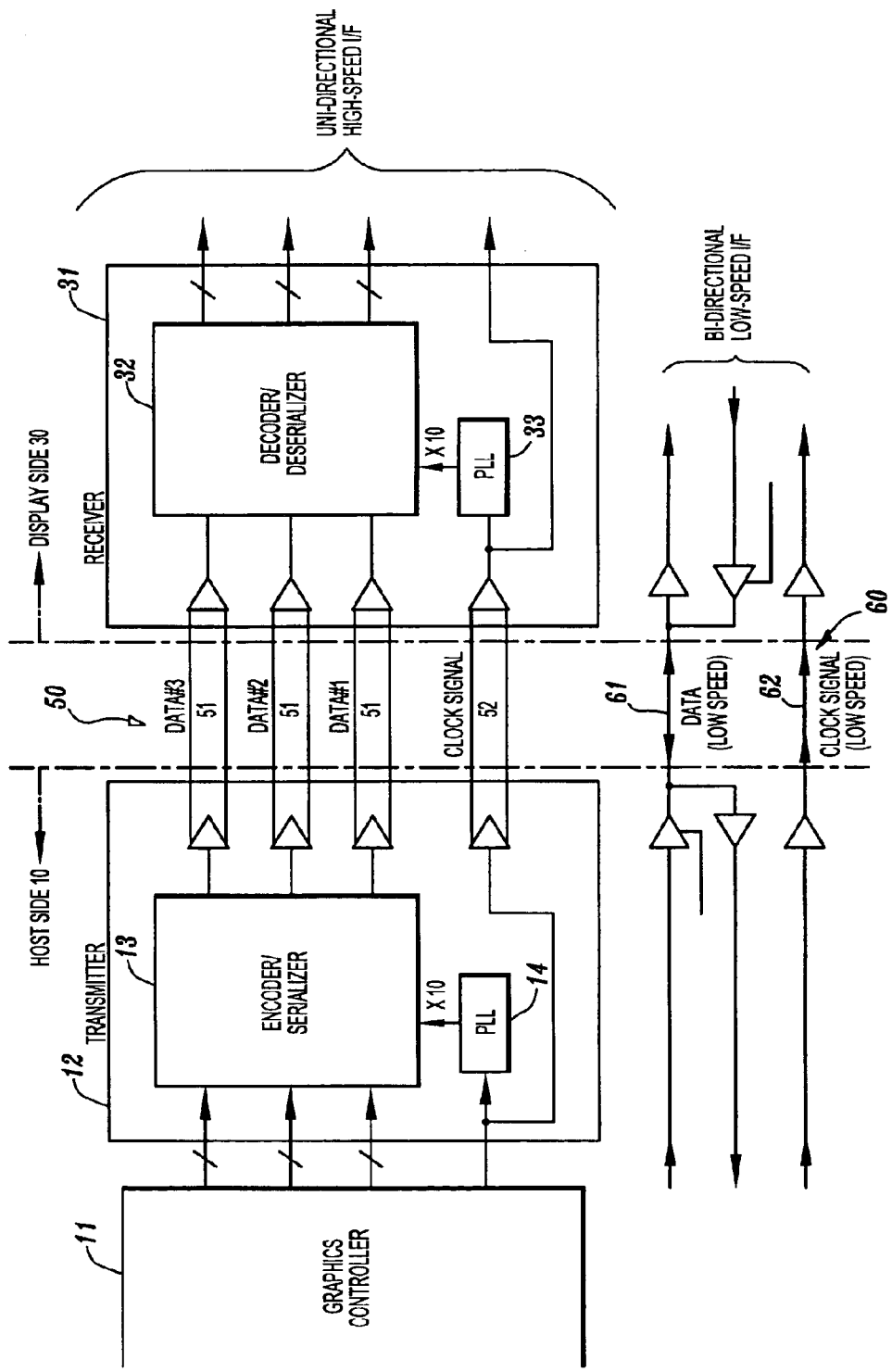
FIG. 2 is a block diagram showing an embodiment of the image display system, which shows a video interface in the system.

Referring to FIG. 2, on the host system side 10, an encoder/serializer (hereinafter referred to as serializer) 13 and a phase locked loop (hereinafter referred to as PLL) 14 are provided in the transmitter 12. This serializer 13 converts image data from parallel data to serial data and delivers the result to the digital I/F 50. Moreover, these PLL 14 forms multiply clock signals for parallel-serial data conversion of the image data.

On the display side 30, a decoder/deserializer (hereinafter referred to as deserializer) 32 and a PLL 33 are provided in the receiver 31. The deserializer 32 converts the image data from serial data to parallel data. Moreover, the PLL 33 forms multiply clock signals for parallel-serial conversion of the image data.

The digital I/F 50 includes a uni-directional high speed transfer line 51 and a uni-directional transfer line 52. The uni-directional transfer line 52 transfers clock signals outputted from the host system side 10. Furthermore, the uni-directional high speed transfer line 51 includes data signal lines, and transfers image data outputted from the host system side 10 in synchronization with the clock signals transferred from the uni-directional transfer line 52.

On the other hand, the control signal line 60 includes a bi-directional low speed transfer line 61 and a clock signal line 62. Panel ID information, error information and the like are transferred to the host system side 10 from the display side 30 through the bi-directional low speed transfer line 61.

Figure 3:
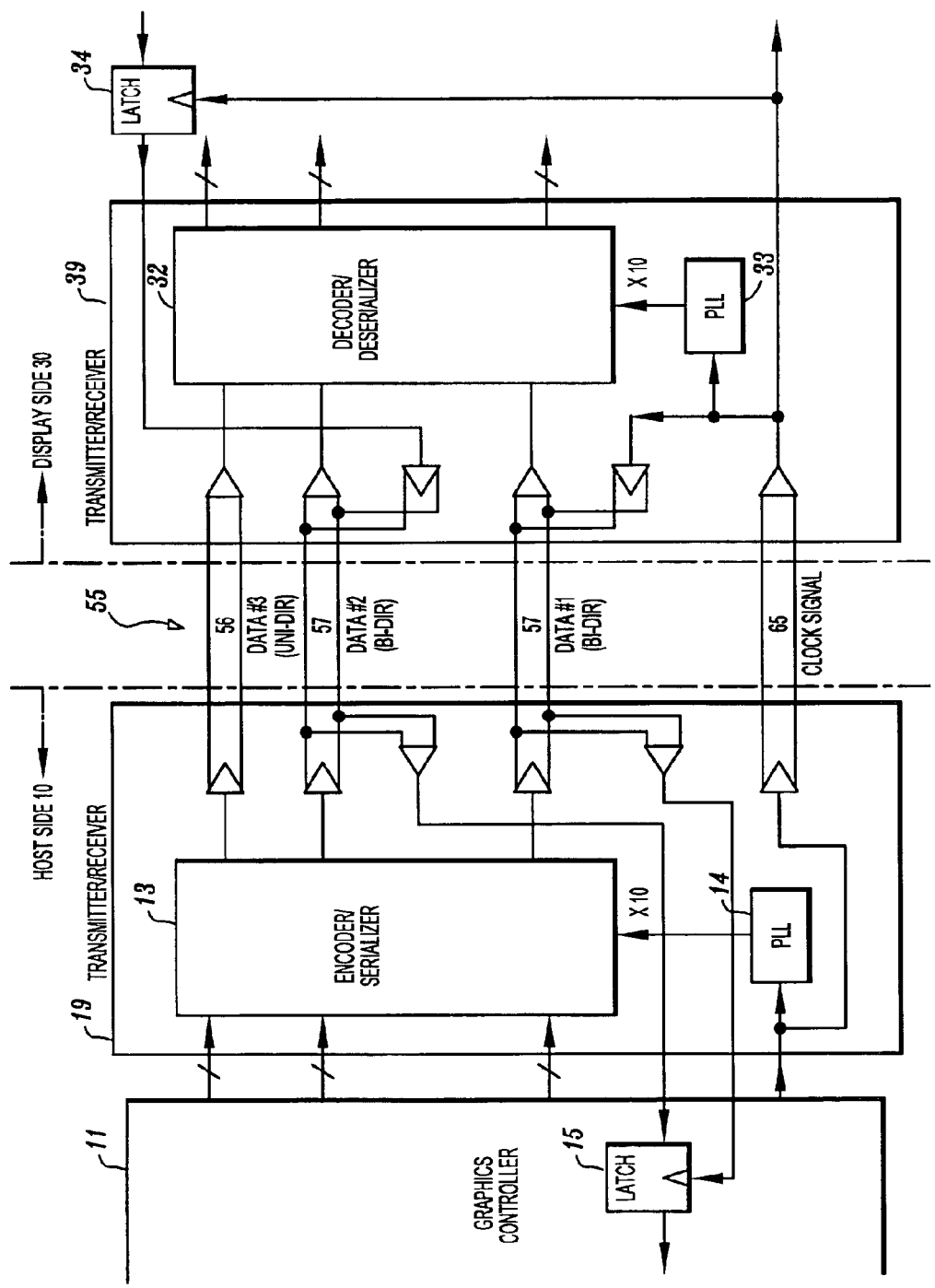
FIG. 3 is a block diagram showing an embodiment of the image display system, which shows another video interface in the system.

FIG. 3 is a block diagram showing another embodiment of the video interface. The video interface has a feature in which only a data line of the uni-directional differential type video interface, such as the conventional LVDS and TMDS, is made to be bi-directional and used for data transfer from the display side 30 to the host system side 10.

A transmitter receiver 19 is provided on the host system side 10, and a transmitter receiver 39 is provided on the display side 30. A digital I/F 55 includes two or more bi-directional high speed transfer lines 57 in addition to a uni-directional high speed transfer line 56. At this time, a clock signal line 65 is made to be uni-directional, which is used for creating high speed clock signals by multiplying the clock signals by the PLL 14 and the PLL 33. Each of the bi-directional high speed transfer lines 57 transfers image data, which was converted from parallel to serial, from the host system side 10 to the display side 30 at a high speed rate in synchronization with the multiply clock signals. Moreover, transfer of data such as ID information and error information, from the display side 30 to the host system side 10, can be executed by directly feed-backing the clock signals to one of the bi-directional high speed transfer lines 57 and by loading data desired to be read on other bi-directional high speed transfer lines 57. A latch 15 is provided in the graphics controller 11, which latches status information read from the display side 30 to keep its output level until subsequent status information is inputted thereto. Moreover, also on the display side 30, a latch 34 is provided for latching status information read out from the host system side 10.

As described above, in the video interface shown in FIG. 3, the conventional differential type video interface must be partially extended as a bi-directional interface. However, the video interface of FIG. 3 has a feature in that a low speed bi-directional transfer line such as DDC is not needed. To simply allow such differential type interfaces to function as a bi-directional interface, clock lines are made to be bi-directional, and two kinds of PLLs must be provided in both directions for multiplying the clock signals to convert image data from parallel to serial. However, this embodiment is premised on that the quantity of data transferred from the display side 30 to the host system side 10 is very small compared to that from the host system side 10 to the display side 30. For this reason, the clock signals transferred from the host system side 10 to the display side 30 are feed-backed by use of one of the data lines (digital I/F 55), and data desired to be transferred from the display side to the host system side 10 is loaded on other data lines. As such, the clock signal line 65 needs not to be bi-directional, and it is unnecessary to provide a clock source on the display side 30 so as to allow it to serve as the bus master. Thus, the data transferred from the display side 30 to the host system side 10 can be executed in a manner that the host system side 10 controls reading out as the bus master. Furthermore, since the quantity of data transferred from the display side 30 to the host system side 10 is small, the parallel-serial conversion of the data needs not to be performed, thus eliminating the need for excessive PLLs.

Note that the data transfer rate from the host system side 10 to the display side 30 varies depending on a resolution level of a panel, which the video interface is able to support in real time. Assuming that an eight bits/color panel of SXGA (1280✕1024dots) can be supported at a refreshing rate of 60 Hz, 24✕110M/8 is equal to 330 M BPS (Byte/Sec) and 24✕120M/8 is equal to 360 M BPS, using that the sum of eight bits of each R, G and B is 24 bits and a pixel clock is 110 to 120 M Hz. Accordingly, the data transfer rate is about 330 M to 360 M BPS. The data transfer rate is generally within the range of 100 M to 1 G BPS.

On the other hand, the data transferred from the display side 30 to the host system side 10 is one bit with a later described first mechanism and 5 to 10 bytes with a second mechanism, for each transfer equivalent to one window, only for confirming the error state in this embodiment. Even if other information is read out together with the image data, the transferred data becomes about 20 to 30 bytes at maximum for one frame (60 Hz) refreshing.

Accordingly, the data transfer rate is:

20✕60=1200BPS in the case of 20 bytes; and

30✕60=1800BPS, that is, the quantity of the transferred data is within the range of about 1.2K to 1.8K BPS.

Accordingly, a ratio of one data transfer rate to another data transfer rate is about 100,000:1 to 1,000,000:1. This embodiment of the present invention is capable of coping with the transfer for a large quantity of data and for a small quantity of data.

FIGS. 4(a) and 4(b) are illustrative views showing an example of data transfer according to an embodiment of the present invention. Packetizing is adopted for the transfer of image data, from the host system side to the display side 30 using either the digital I/F 50 or the digital I/F 55.

In FIG. 4(a), a packet enable signal 70 and packetized data 71 are transferred on the uni-directional high speed transfer lines 51 and 56 and the bi-directional high speed transfer line 57 in synchronization with the clock signals transferred on the uni-directional transfer lines 52 and 65. In the specification for TMDS, data equivalent to 10 bits for each of R (Red)/G (Green)/B (Blue), that is, 30 bits in total, can be transferred. In the conventional video data transfer, video data of R (Red), G (Green) and B (Blue), a DE signal indicating data valid, a vertical synchronization, a horizontal synchronization, and other control signals of about two are sent in series. This embodiment is constituted by utilizing the specification of TMDS so that one bit is secured for a packet enable signal 70 and 24 bits are secured for packetized data 71. The packet enable signal 70 indicates a valid packet period of the packetized data 71. The packetized data 71 of undefined and uneven length can be transferred by use of the packet enable signal 70.

A packetized data 71 includes a header portion 72, a body portion 73 and a footer portion 74. A sub area address field 75 is provided in the header portion 72. The header portion 72 has a start transfer bit 79 for deciding whether or not the image data is the one being re-transferred and a sync data bit 80 for indicating that the image data to be transferred is the one of a new frame. By using these bits and adding other bits, it is possible to indicate that the image data is for a moving picture. For example, by indicating that the image data is for a moving picture, a later described error handling can be omitted. The body portion 73 has a video data area 76 in which the image data is actually transferred, and an attribute field 77. As described above, the window that makes sense in a block in an image space of which the application on the host system side 10 is conscious is defined, and the image data can be transferred in a unit of window. Specifically, the image data transferred in the video data area 76 is transferred as a line unit within a range defined by the window. Moreover, the attribute field 77 stores address information relating to a finer sub area to be later described, and stores information relating to a range in the sub area of the video data, a scaling factor and the like.

Here, the sub area is one of the areas obtained by uniformly dividing the whole of a display area of the panel 40, which have respectively a given size. The sub area means a unit which can be processed by a later described comp bit in executing an error detection. The sub area that is this processing unit equal to one line unit or one rectangular unit, and the transferred video data included in one packet is for displaying one of the sub areas. In other words, the maximum number of video data sent by one packet is equivalent to all pixels in one sub area, and the minimum number of video data is equivalent to one pixel.

The footer portion 74 has a transfer error checking/ correction field 78 for executing checking a transfer error using a parity bit, an Error Checking Correcting (ECC), or a Cyclic Redundancy Check.

FIG. 4(b) is a diagram showing more detailed structures of the body portion 73 and the footer portion 74. In this embodiment, 24 bits in total of horizontal parity bits, for example, is adopted as the transfer error checking/correction field 78 as shown in FIG. 4(b). The video data is divided in a unit of 24 bits (a word), and the exclusive OR operation is implemented on the data positioned in the same location in each word. Thus, the horizontal parity bit is generated and then compared with the transfer error checking/correction field 78. By obtaining the OR operation for the 24 bits, the parity error of the whole of the video data is outputted.

A first mechanism of the error handling in this embodiment will be described with reference to FIGS. 4(a) and 4(b) and FIGS. 5 to 7.

In the first mechanism, as the sub area that is a unit for detecting a transfer error, one line is employed.

Figure 4:
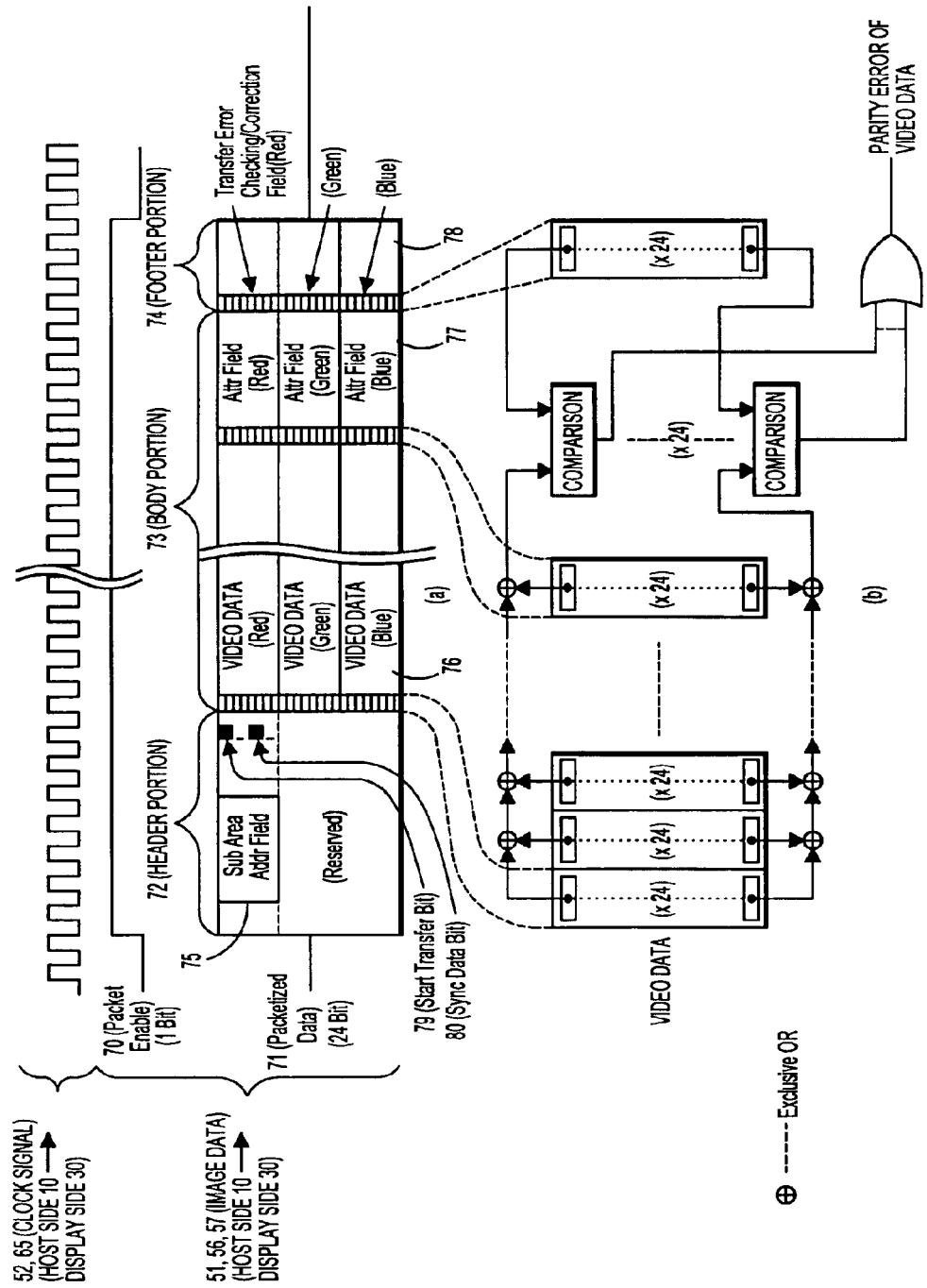
FIGS. 4(a) and 4(b) are illustrative views of data transfer in an embodiment of the image display system.
Figure 5:
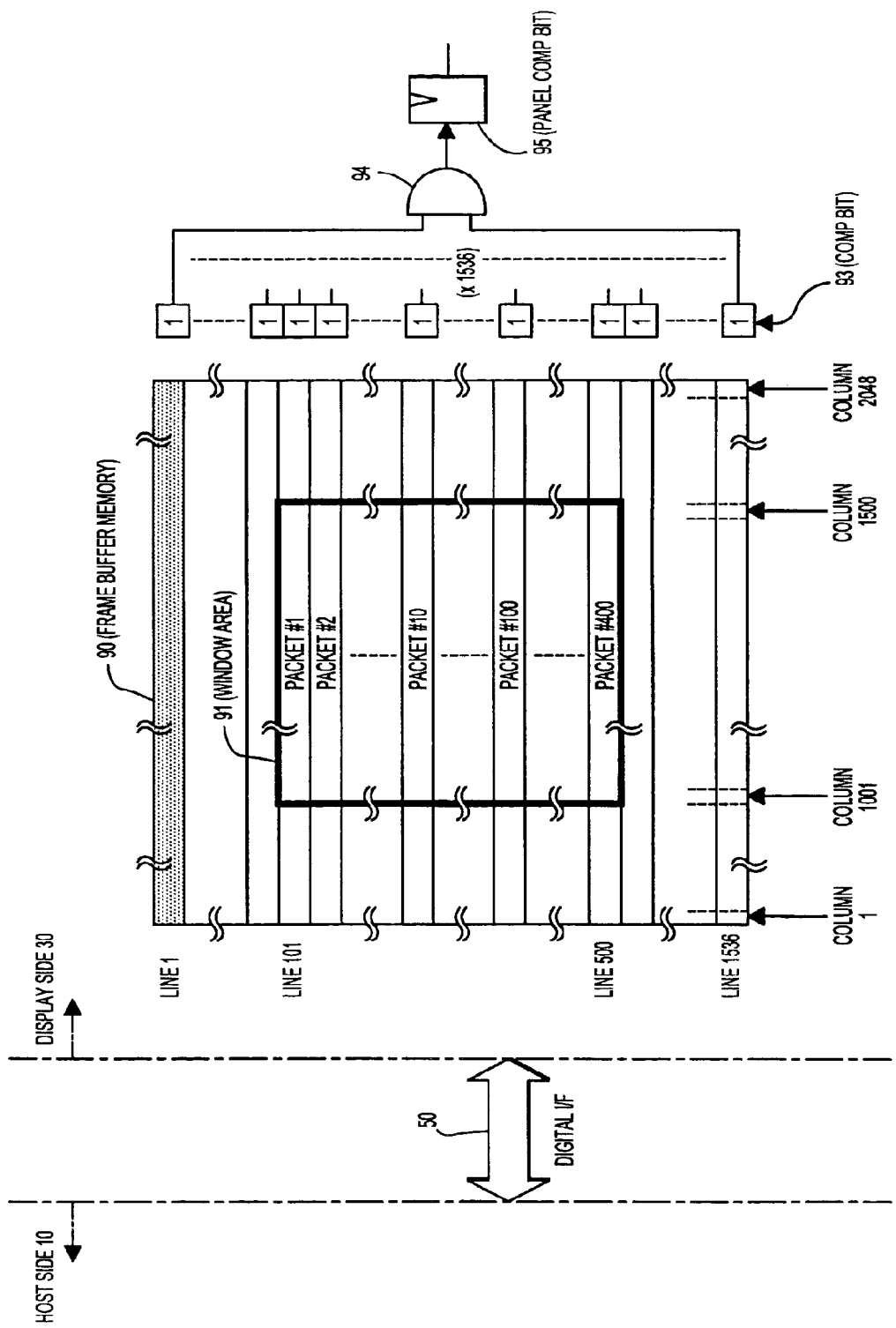
FIG. 5 is a diagram showing an example of transfer error handling according to FIG. 4.

FIG. 5 shows an example of the transfer error handling in the above-described format and FIG. 4. Reference numeral 90 denotes a frame buffer memory, and reference numeral 91 denotes a window area. The frame buffer memory 90 is physically provided in the above-described panel memory 36. Here, for the sake of descriptions of a theoretical constitution, the frame buffer memory 90 is described. Moreover, reference numeral 93 denotes a comp bit, which is provided in each sub area. In the example of FIG. 5, the comp bit 90 is provided for each line. Reference numeral 94 denotes an AND circuit, and the AND circuit 94 outputs a low level output (OFF) when-there is any one of the sub areas in which the data transfer is not finished normally. Numeral 95 denotes a panel comp bit, which is read out from the host system side 10. To be more specific, in this embodiment, the status bit (the comp bit 93) indicating normal completion of the data transfer to the sub area is provided for each sub area, and outputs from all comp bits 93 are logically multiplied (AND). The resultant is the status bit (the panel comp bit 95) indicating the normal completion of the data transfer in the whole of the display area. The default value of each comp bit 93 after power on reset, is ON (High).

Figure 6:
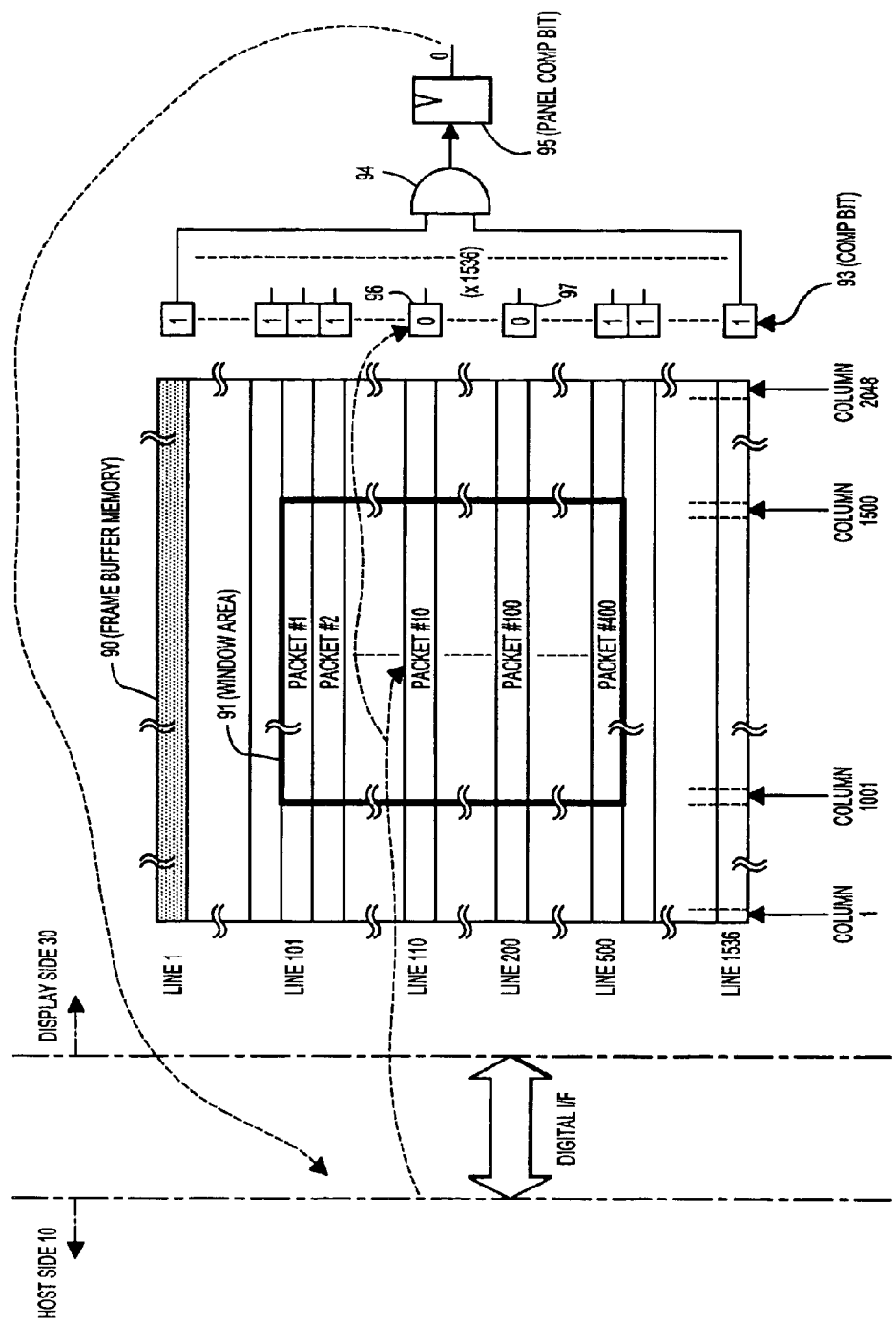
FIG. 6 is an illustrative view showing a case where a parity error occurs after transferring a window area 91.

FIG. 6 is an illustrative view showing the case in which the parity error occurs after transfer of the window area 91. In FIG. 6, the reference numerals, which denote the structure, correspond to those of FIG. 5.

Figure 7:
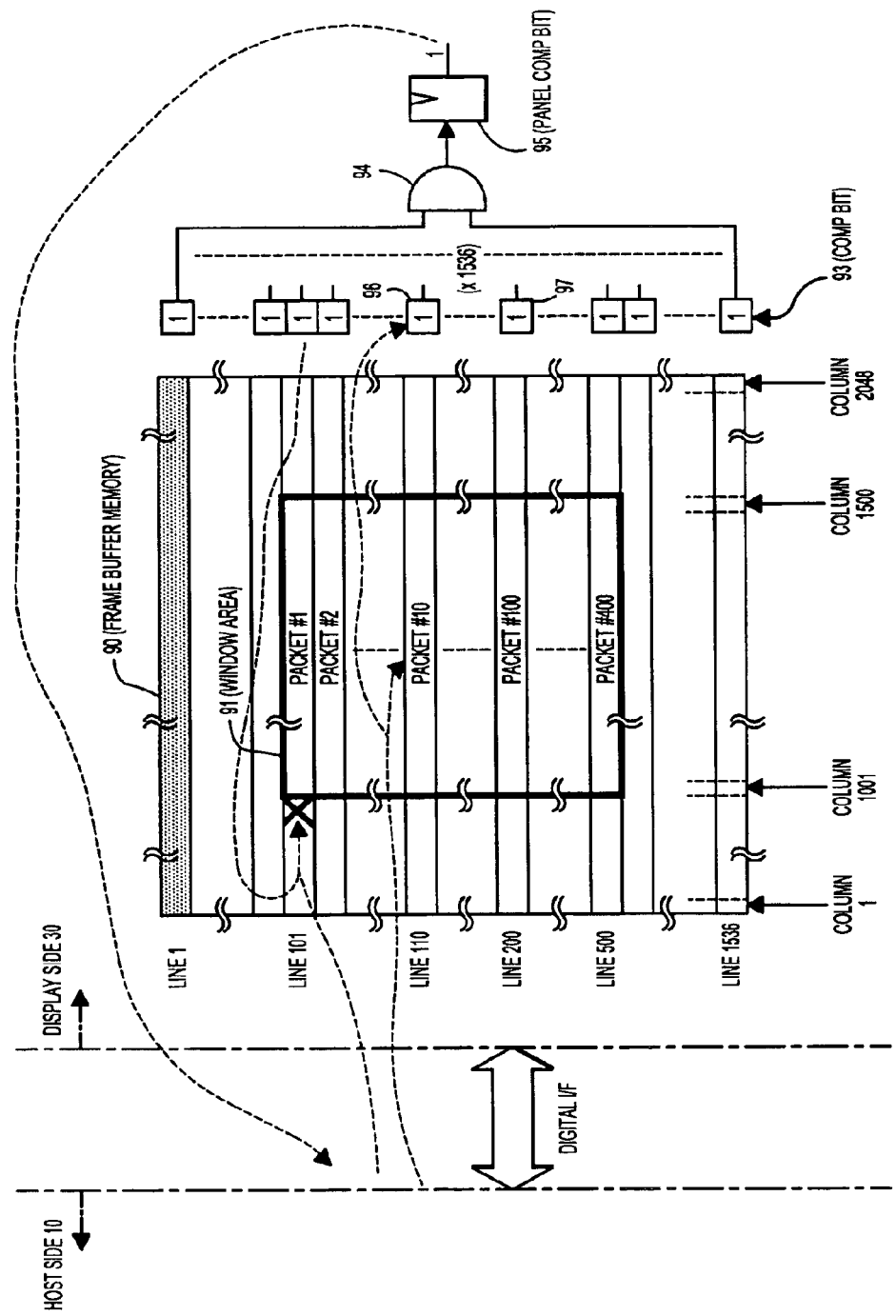
FIG. 7 is an illustrative view showing a state where a re-transfer sequence is executed.

FIG. 7 is an illustrative view showing a situation in which re-transfer sequence is carried out. In FIG. 7, the reference numerals, which denote the structure, correspond to those of FIGS. 5 and 6.

First of all, to update the display of the rectangular area (a window area 91) where the display exists, the host system side 10 starts to transfer the video data. At this time, the minimum range of a group of the sub areas covering the rectangular area is decided, thus the data for each sub area in the group is packetized into a packetized data 71, and the packetized data 71 is transferred sequentially. By the sub area address field 75 provided in the header portion 72 of each packetized data 71, the display side 30 decides to which sub area the packetized data 71 is transferred, and writes data to the corresponding frame buffer memory 90.

When a first packet of the window area 91 is transferred, the start transfer bit 79 and the sync data bit 80 are made to be ON. The sync data bit 80 is used to detect that the transmission of the first sub area for the window area 91 has been made toward the display side 30, and to accomplish synchronization. The display side 30 refers to the sub area address field 75 of the packetized data 71, and decides to which sub area the video data sent thereto corresponds. Moreover, the display side 30 detects that the start transfer bit 79 remains ON, and sets the comp bit 93 corresponding to this sub area to be OFF (=Low). Next, the display side 30 writes the video data included in the body portion 73 of the packetized data 71 to the frame buffer memory 90 corresponding to the sub area. At the same time, based on the value of the video data and the value of the transfer error checking/correction field 78, the display side 30 decides whether or not an uncorrectable transfer error occurred by means of parity check, CRC, or ECC method. If the uncorrectable transfer error did not occur, the comp bit 93 is allowed to be ON again. If the uncorrectable transfer error occurred, the comp bit 93 is made to remain OFF.

From a second packet transfer of the window area 91 and after, the packetized data 71 is transferred in a state where the start transfer bit 79 is made to be ON and the sync data bit 80 is made to be OFF. In the same manner as that in the first transfer of the packetized data 71, the display side 30 refers to the sub area address field 75 of the packetized data 71, and decides to which sub area the video data sent thereto corresponds. Then, the display side 30 detects that the start transfer bit 79 remains ON, and makes the comp bit 93 corresponding to this sub area OFF (Low). Next, the display side 30 writes the video data included in the body portion 73 of the packetized data 71 to the frame buffer memory 90 corresponding to the sub area. At the same time, based on the value of the video data and the value of the transfer error checking/correction field 78, it is decided whether or not an uncorrectable transfer error occurred. If the uncorrectable transfer error did not occur, the comp bit 93 is allowed to be ON again. If the uncorrectable transfer error occurred, the comp bit 93 is made to remain OFF.

Thereafter, at the time when the transfer of all packets equivalent to the window area 91 is finished, the panel comp bit 95 on the display side 30 is checked from the host system side 10.

If the panel comp bit 95 checked is ON, it is supposed that the transfer of all the packets is completed without any error. The host system side 10 finishes the transfer sequence for the window area 91.

If the panel comp bit 95 checked is OFF, it is assumed that a transfer error occurs in any sub area. Then, a re-transfer sequence for the window 91 is begun.

In the re-transfer sequence, the start transfer bit 79 is made to be OFF in each of all packets. When a certain packet is transferred, its sub area address field 75 is referred to, in order to decide to which sub area the video data transferred corresponds, and it is detected that the start transfer bit 79 is OFF. The comp bit 93 corresponding to this sub area is not changed.

Next, if the comp bit 93 is OFF, the video data included in the body portion 73 of the packetized data 71 is written to the frame buffer memory 90 corresponding to the sub area. At the same time, based on the value of the video data and the value of the transfer error checking/correction field 78, it is decided whether or not an uncorrectable transfer error occurred. If the uncorrectable transfer error did not occur, the comp bit 93 is made to be ON again. If the uncorrectable transfer error occurred, the comp bit 93 is made to remain OFF.

When the comp bit 93 is ON, the video data included in the body portion 73 of the packetized data 71 is not written to the frame buffer memory 90. The results of the transfer error are neglected, and are not reflected in the decision of ON/OFF for the comp bit 93.

At the time when the transfer of all packets concerning the re-transfer sequence is finished, the panel comp bit 95 on the display side 30 is checked again from the host system side 10. If the panel comp bit 95 checked is ON, it is supposed that the transfer of all the packets is completed without any error. Then the host system side 10 finishes the transfer sequence for the window area 91. If the panel comp bit 95 checked is OFF, it is assumed that the re-transfer sequence is iterated again.

The above-described procedures in the error checking and the re-transfer sequence, will be further described with reference to a specific example.

In FIG. 5, it is assumed that the sub area is equivalent to one line of the display screen. In this example, the whole of the display area of the display shows a resolution of QXGA (2048☒1536dots). The frame buffer memory 90 is assumed to cover the whole of the display area of the display side 30. In FIG. 5, the frame buffer memory 90 has the first line to the 1536th line in the longitudinal direction, and the first column to the 2048th column in the lateral direction. Among these lines and columns, it is assumed that the window area 91 is a rectangular area which extends from the 101st line to the 500th line in the longitudinal direction and from the 1001st column to the 1500th column in the lateral direction. In the window area 91, a first packet for transferring the video data transfers the video data equivalent to the 101st line, and a second packet transfers the video data equivalent to the 102nd line. The final 400th packet transfers the video data equivalent to the 500th line. At this time, the video data included in the body portion 73 of each packetized data 71 is equivalent to 500 pixels from the 1001st column to the 1500th column.

FIG. 6 shows the case where a parity error occurs after transferring the window area 91.

It is assumed that, the parity errors occurred at the time when the tenth packet (the 110th line) and the 100th packet (the 200th line) are transferred in transferring 400 pieces of packets. Then the comp bit 96 of the 110th line is made to be "0" (OFF) when the transfer of the tenth packet is finished. Moreover, the comp bit 97 for the 200th line is made to be "0" (OFF) when the transfer of the 100th packet is finished. Thus, when the host system side 10 reads out the panel comp bit 95 after completion of the transfer for the final 400th packet, the host system side 10 can read out the panel comp bit 95 as OFF (Low).

FIG. 7 shows a state where the re-transfer sequence is executed.

The host device 10 which recognized that the panel comp bit 95 was OFF (Low), starts re-transfer sequence for the same window 91. In this re-transfer sequence, 400 pieces of packets for the 101st to 500th lines are transferred. However, for the packets other than those equivalent to the 101st and the 200th lines, the comp bits 93 have already been detected being ON, and video data is not written to the frame buffer memory 90. The symbol "☒" in FIG. 7 indicates that writing of the video data onto the frame buffer memory 90 is not performed. Only at the time when two packets equivalent to the 110th and the 200th lines are transferred, it is detected that the comp bits 96 and 97 thereof are OFF, and the video data is written to the frame buffer memory 90. Assuming that any parity error does not occur in transferring these two packets, all of the comp bits 93 are made to be ON, so that the panel comp bit 95 is also made to be ON. Accordingly, when the host system side 10 reads out the panel comp bit 95 after completion of the transfer of the 400th packet in the re-transfer sequence, it can be detected that the panel comp bit 95 is ON (High). Thus, the transfer sequence for this window area 91 is completely finished.

In the first mechanism described with reference to FIGS. 5 to 7, although one comp bit 93 is provided for each sub area as a line of the frame buffer memory 90, the comp bits 93 may be provided corresponding to the sub areas for each window.

According to the first mechanism described above, error information read out by the host system side 10 needs only one bit for each one window area transfer, and hence an interface from the display side 30 to the host system side 10 can be made so as to have small capacity.

Next, a second handling mechanism in this embodiment will be described with reference to FIGS. 4(*a*) and 4(*b*) and FIGS. 8 to 11. In the second mechanism, the panel is divided into sub areas of several bits-by-several bits as a unit for detecting transfer errors, and the packets transferred in a unit of the sub area are subjected to error handling and re-transfer.

Figure 8:
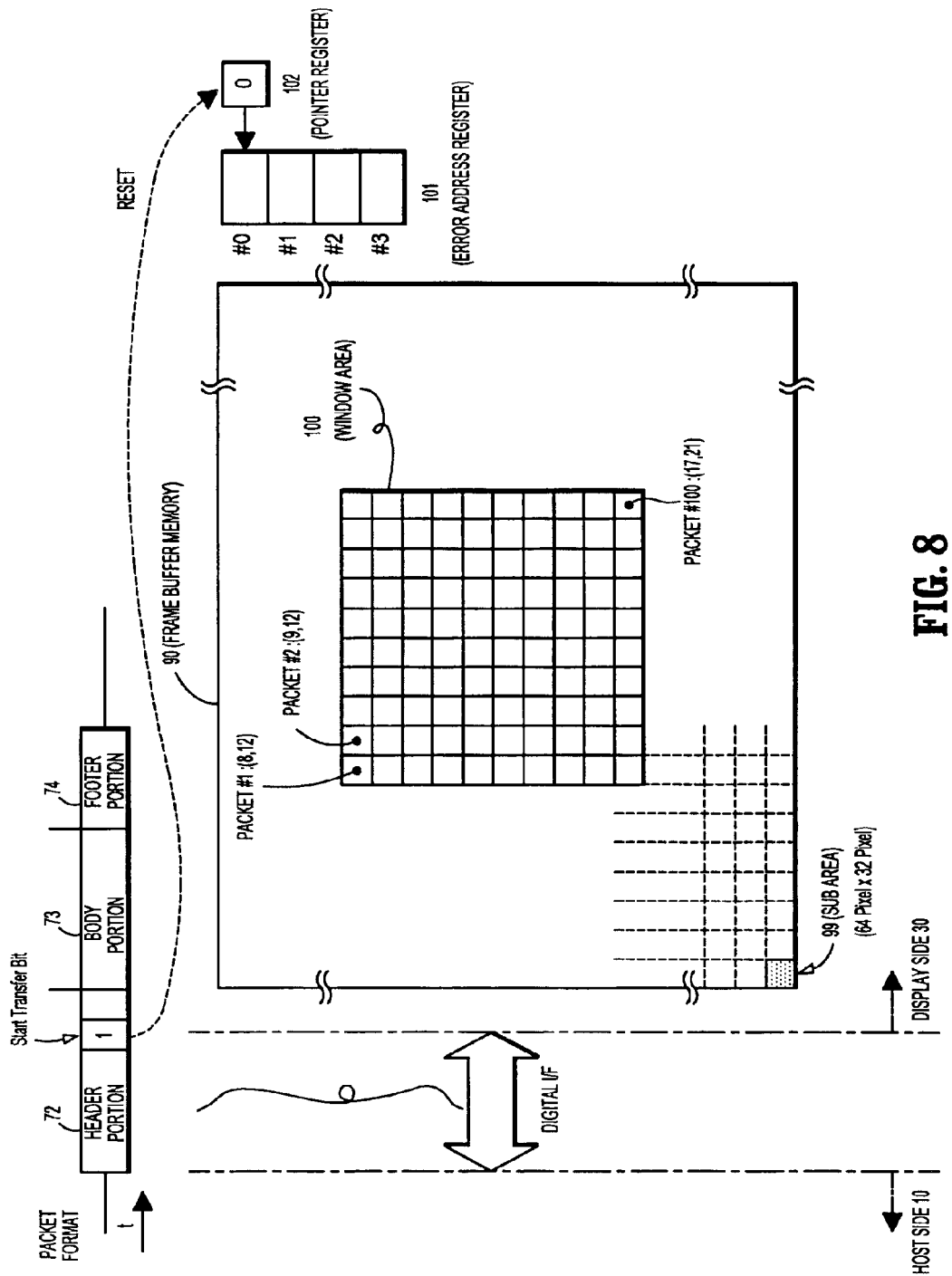
FIG. 8 is another illustrative view showing a state where the re-transfer sequence is executed.

FIG. 8 is a diagram showing another example of the transfer error handling. Referring to FIG. 8, reference numeral 99 denotes a sub area, which is supposed to be a small rectangular area of 64 pixels horizontally and 32 pixels vertically. Reference numeral 100 denotes a window area. Reference numeral 101 denotes an error address register including address information and the like, which are capable of identifying packets. Reference numeral 102 denotes a pointer register indicating the number of errors.

Figure 9:
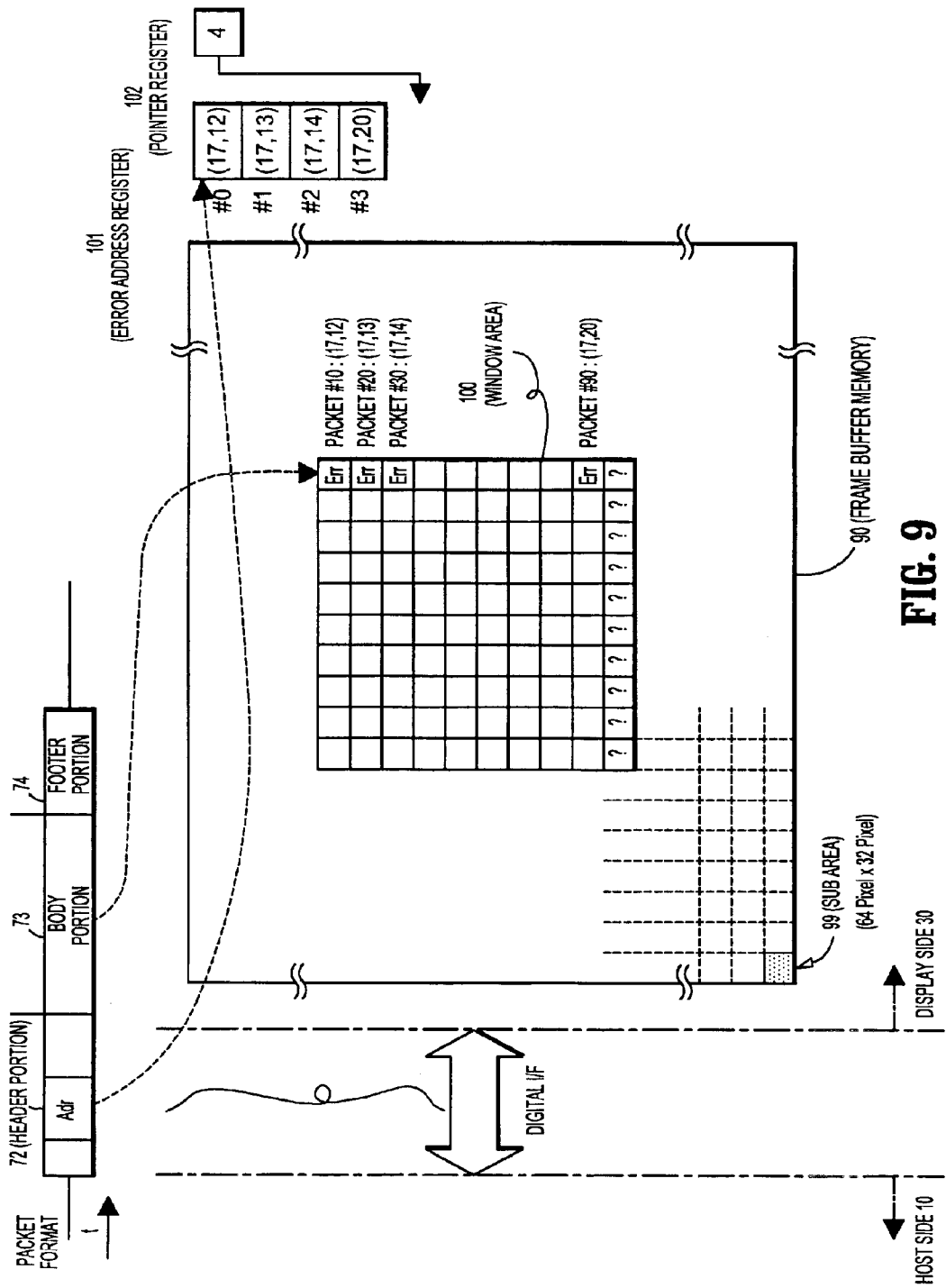
FIG. 9 is a diagram showing a state where a transfer error occurs when the window area 100 is transferred in another example.

FIG. 9 is a diagram showing a state where a transfer error occurs in transferring the window area 100.

Figure 10:
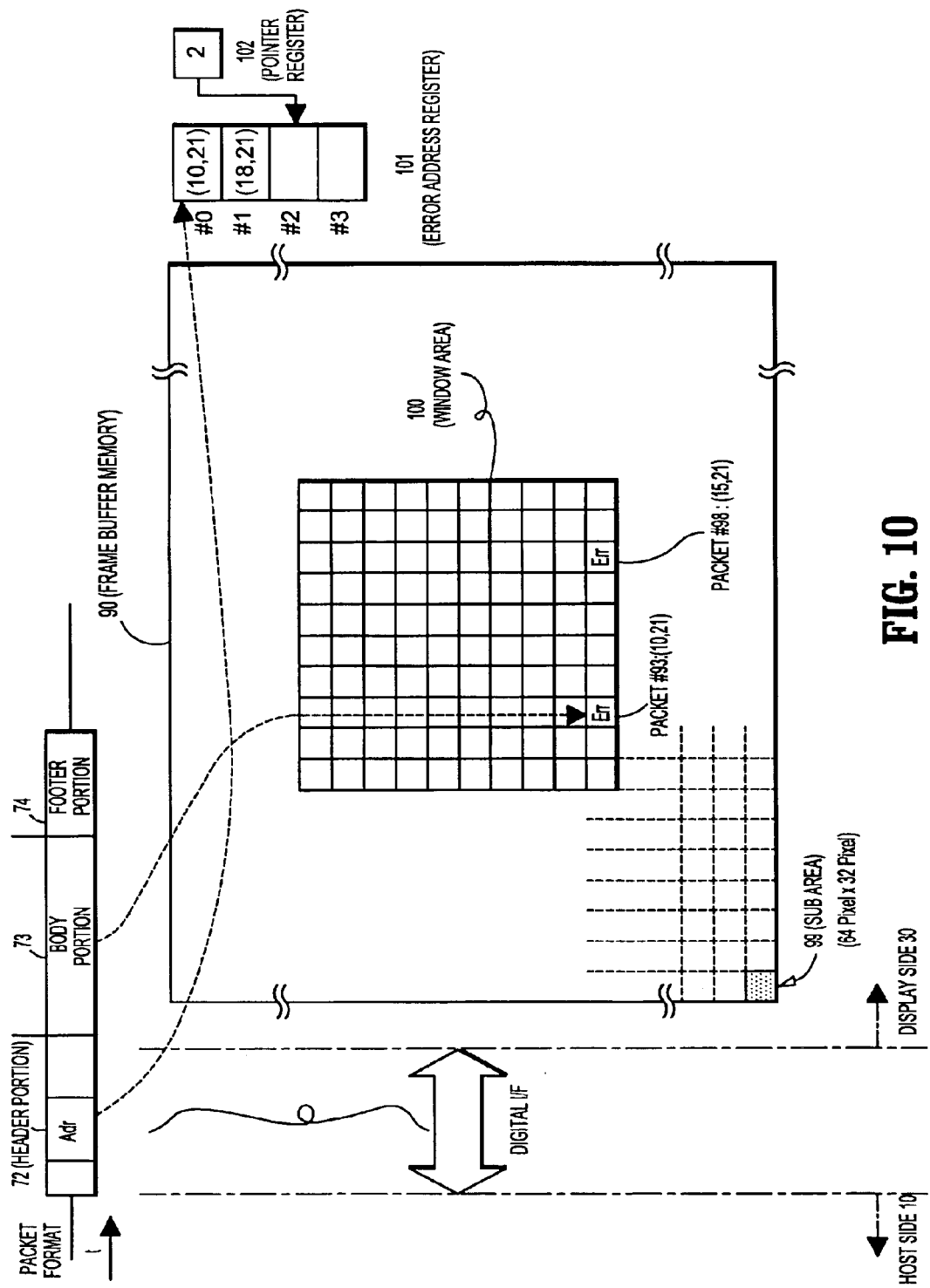
FIG. 10 is a diagram showing a state where a new transfer error occurs when re-transfer is executed in another example.

FIG. 10 is a diagram showing a state where a new transfer error occurs in executing re-transfer.

Figure 11:
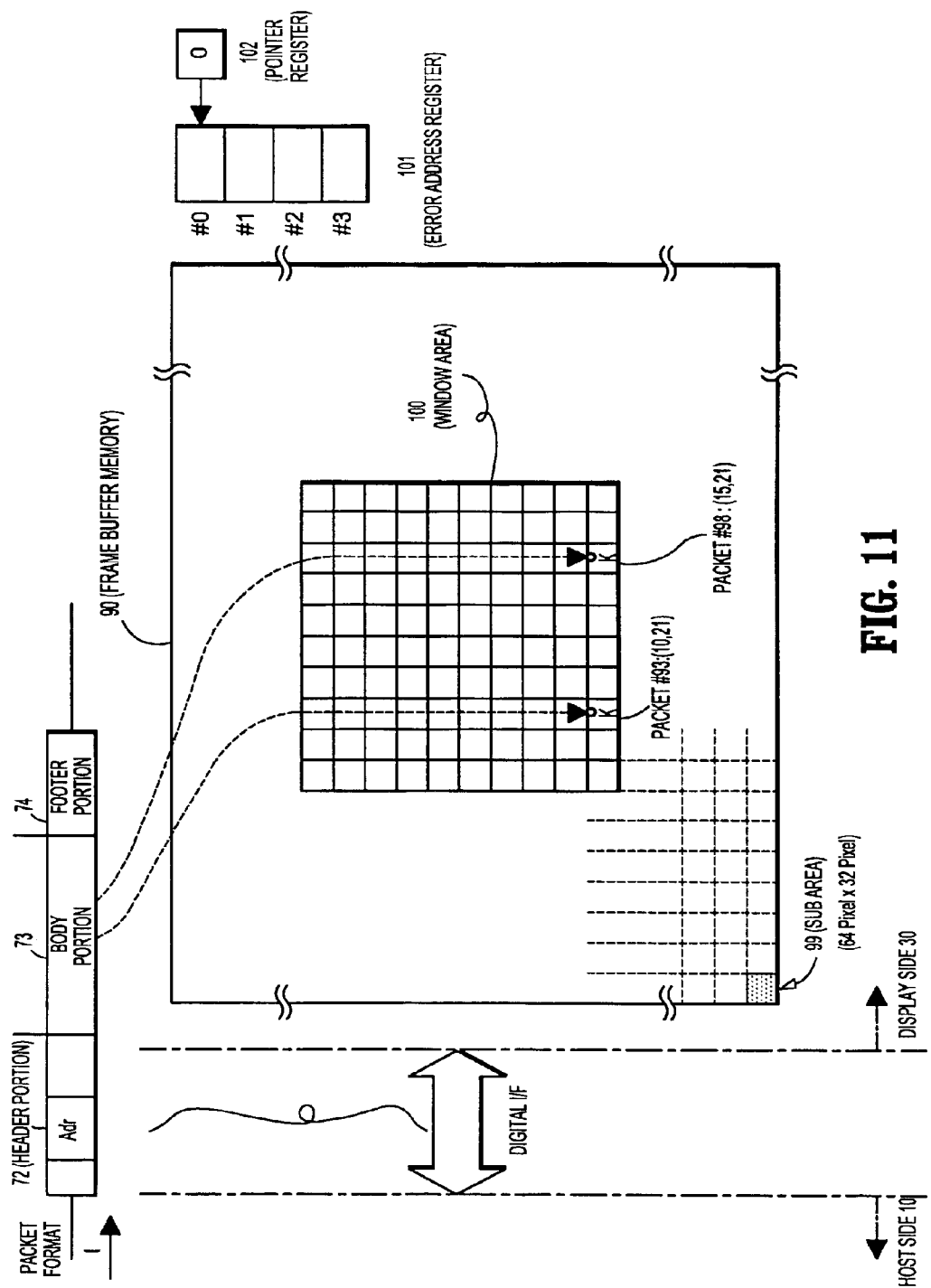
FIG. 11 is a diagram showing a state where a transfer sequence is completed by executing transfer after the re-transfer in another example.

FIG. 11 is a diagram showing a state where a transfer sequence is completed after executing the second re-transfer.

As shown in FIG. 8, in the display side 30, provided are registers, that is, M pieces of registers represented in #0, #1, ... and #(M−1), for storing address information and the like of the sub area 99 which caused the transfer error. The number M (maximum value) is arbitrarily decided in consideration of an error rate in a system including the host system side 10 and the display side 30. Moreover, although a packet number is generally used for the error address register 101, any kind of error address register may be employed as long as it can identify a packet. Moreover, on the display side 30, provided is the pointer register 102 which indicates a pointer for the error address register 101 and is incremented by the number of address information stored in the error address register 101. In the pointer register 102, a default value is made to be "0" after power on reset.

In order to update the display of the window area 100 of the display side 30, when the host system side 10 starts to transfer the video data, a sub area group that is the minimum unit covering the window area 100 is decided. Therefore, the data is packetized for each sub area into packetized data 71, and the packetized data 71 is transferred sequentially. By use of the sub area address field 75 provided in the header portion 72 of each packetized data 71, the display side 30 decides to which sub area 99 the packetized data 71 is transferred, and writes image data to the corresponding frame buffer memory 90.

In transferring a first packet in the window area 100 to be transferred, the start transfer bit 79 and the sync data bit 80 in the header portion 72 are made to be ON. The sync data bit 80 is used for detecting that the first sub area of the window area 100 has been sent to the display side 30 and for accomplishing synchronization. The display side 30 detects that the start transfer bit 79 is ON, and initializes the value of the pointer register 102 to "0". Thereafter, the display side 30 refers to the sub area address field 75 of the packetized data 71, and decides to which sub area 99 the video data sent thereto corresponds. Next, the display side 30 writes the video data included in the body portion 73 of the packet to the frame buffer memory 90 corresponding to the sub area 99. At the same time, based on the value of the video data and the value of the transfer error checking/correction field 78, the display side 30 decides whether or not an uncorrectable transfer error occurred. If any uncorrectable transfer errors occurred, the value of the address of the sub area 99 is recorded in the error address register 101 indicated by the pointer register 102, and the value of the pointer address 102 is incremented by one. If an uncorrectable transfer error did not occur, any operation is not performed.

From a second packet transfer of the window area 100 and after, the packetized data 71 is transferred in a state where the start transfer bit 79 and the sync data bit 80 are made to be OFF. In the same manner as that in the first transfer of the packetized data 71, the display side 30 refers to the sub area address field 75 of the packetized data 71, and decides to which sub area the video data sent thereto corresponds. Then, the display side 30 writes the video data included in the body portion 73 of the packetized data 71 to the frame buffer memory 90 corresponding to the sub area. At the same time, based on the value of the video data and the value of the transfer error checking/correction field 78, it is decided whether or not the uncorrectable transfer error occurred. If any uncorrectable transfer errors occurred, it is determined whether or not the value of the pointer register 102 is equal to M (Maximum value) or less. If the value of the pointer register 102 is less than M, the value of the address of the sub area 99, for example, is recorded in the error address register 101 indicated by the pointer register 102, and the value of the pointer register 102 is incremented by one. If the value of the pointer register 102 is equal to M, or if the uncorrectable transfer errors did not occur, any operation is not performed.

Here, it is assumed that the value of the pointer register 102 is equal to P ($0 \leq P \leq M$) at the time when the transfer of all packets of the window area 100 is completed. The value P of the pointer register 102 of the display side 30 is checked from the host system side 10.

If the value P of the pointer register 102 is equal to zero, it is regarded as that the transfer of all the packets of the window area 100 is finished without any error. Then, the host system side 10 completes the transfer sequence for the window area 100.

If the value P of the pointer register 102 is not equal to zero, the host system side 10 decides that a transfer error occurred in any of the sub areas 99, and reads from #0 (the first register) to #(P-1) (the P-th register) of the error address register 101. The host system side 10 starts the re-transfer sequence of the window 100.

The re-transfer sequence is performed in accordance with the following procedures.

i) When P<M is established, the host system side 10 sequentially transfers only the packets equivalent to P pieces of the sub areas 99 indicated by the value of the registers represented by the symbols #0 to #(P-1), which are included in the error address register 101, to the display side 30.

ii) When P=M is established the host system side 10 sequentially transfers to the display side 30 the packets equivalent to all of the sub areas 99 in the window 100, which have larger values than that of the register represented by the symbol #(P-1), in addition to the packets equivalent to the P pieces of the sub areas 99 indicated by the value of the registers represented by the symbols #0 to #(P-1), which are included in the error address register 101.

In transferring the first packet in the window area 100 to be transferred, the start transfer bit 79 in the header portion 72 is made to be ON. At this time, the sync data bit 80 is OFF. The display side 30 detects that the start transfer bit 79 is ON, and initializes the value of the pointer register 102 to "0". Thereafter, the display side 30 writes the video data to the frame buffer memory 90 corresponding to the sub area 99 indicated by the sub area address field 75. At the same time, if an uncorrectable transfer error occurred, the value of the address of the sub area 99 is recorded in the error address register 101 indicated by the pointer register 102, and the value of the pointer address 102 is incremented by one. If the uncorrectable transfer error did not occur, any operation is not performed.

In transferring the second packet and after, the start transfer bit 79 in the header portion 72 is made to be OFF. The display side 30 writes the video data to the frame buffer memory 90 corresponding to the sub area 99 indicated by the sub area address field 75, similarly. At the same time, if the uncorrectable transfer error occurred, the value of the address of the sub area 99 is recorded in the error address register 101 indicated by the pointer register 102, and the value of the pointer address 102 is incremented by one. If the uncorrectable transfer error did not occur, any operation is not performed.

It is assumed that the value of the pointer register 102 is equal to P ($0 \leq P \leq M$) at the time when the transfer of all packets in the re-transfer sequence is completed. The host system side 10 checks the value P of the pointer register 102 in the display side 30.

If the value P of the pointer register 102 is equal to zero, it is regarded as that a transfer of all packets of the window area 100 is finished without any error. The host system side 10 completes the transfer sequence for the window area 100.

If the value P of the pointer register 102 is not equal to zero, the host system side 10 decides that the transfer error occurred in any of the sub areas 99, and reads from #0 (first register) to #(P-1) (P-th register) of the error address register 101. The host system side 10 then iterates the re-transfer sequence described above.

The procedures in the error checking and the re-transfer sequence, which were described as above, will be further described specifically with reference to FIGS. 8 to 11.

Similarly to the example described in FIG. 5, it is assumed that the whole display area of the panel 40 in the second error handling mechanism, shown in FIG. 8, exhibits a resolution of QXGA (2048×1536dots). Since the sub area 99 is a small rectangular area of 64 pixels laterally by 32 pixels longitudinally, all the display area is divided into 1536 pieces of sub areas 99, that is 32 pieces laterally and 48 pieces longitudinally. The error address register 101 includes four registers represented by the symbols #0 to #3.

As shown in FIG. 8, it is assumed that the window area 100 desired to be displayed is covered by 100 sub areas 99 forming a rectangular region. In this case, the region includes the sub areas starting from the one at the intersection point of the eighth position from the left side of the panel laterally and the twelfth from above longitudinally (position (8,12) in a coordinate system), and ending at the sub area at the position (17,21) in the coordinate system. In other words, the first packet (packet #1) in the window 100 for video data transfer is the sub area 99 disposed at the coordinates (8,12), and the second packet (packet #2) is the sub area 99 disposed at the coordinates (9,12). Moreover, the 100th packet that is a final packet is the sub area 99 disposed at the coordinates (17,21).

As shown in FIG. 9, it is assumed that in the transfer of 100 pieces of sub areas, parity errors occurred in transferring each of the tenth packet (coordinates (17,12)), the 20th packet (coordinates (17,13)), the 30th packet (coordinates (17,14)) and the 90th packet (coordinates (17,20)). At the time of transferring the final 100th packet, the value of the pointer register 102 is "4". This value is read by the host system side 10, and subsequently the values of registers #0 to #3 of the error address register 101 are read.

Since the value of the pointer register 102 read by the host system side 10 is not "0", the re-transfer sequence is begun for the same window area 100. In this re-transfer sequence, among 100 pieces of sub areas 99 covering the window area 100, four sub areas 99 indicated by the read value of the error address register 101 are written to the frame buffer memory 90. Image data equivalent to the sub areas 99 after the one represented by the #3 of the error address resister 101 is transferred in the form of packet together with the four sub area 99, and is written to the frame buffer memory 90. This is because the read value of the error address register 101 is the MAX value (=4), so that there is a possibility of occurrence of a parity error also in the sub areas 99 after the one represented by the #3.

As shown in FIG. 10, it is assumed that in the re-transfer sequence, the parity error occurred in transferring the sub area positioned at the coordinates (10,21) and the sub area positioned at the coordinates (15,21). At the time of completion of the transfer of the final packet, the value of the pointer register 102 is 2. The host system side 10 reads this value, and subsequently the values of the registers represented by the #0 and #1 are read out.

Since the value of the pointer register 102 read by the host system side 10 is not "0" again, the re-transfer sequence is begun for the same window 100 again. In this re-transfer sequence, among 100 pieces of sub areas 99 covering the window area 100, image data of the portion corresponding to the two sub areas 99 indicated by the read value of the error address register 101, is transferred in the form of two packets, and written to the corresponding frame buffer memory 90. At this time, since the read value of the pointer register 102 is not "4" as the MAX value, but "2", it is decided that the parity error in the transfer occurred only twice.

As shown in FIG. 11, it is assumed that no parity error has occurred in this re-transfer sequence. At this time, the value of the pointer register 102 remains "0" also at the time of completion of the transfer of the final second packet. Since this value is read by the host system side 10 and is "0", the re-transfer sequence for this window 100 is finished.

According to this second mechanism, the comp bit 93 needs not to be provided for each sub area unlike the foregoing first mechanism, and hence consumption of logic can be prevented. Moreover, in the re-transfer it is unnecessary to transfer the packets of the whole of the window area again, and the re-transfer is required only for a sub area 99 in which the transfer error occurred.

As described above, according to the embodiment of the present invention, when distributed data processing is performed for the display image between the host system side 10 and the display side 30, a video interface mechanism can be optimized. Accordingly, it is possible to solve the problems of insufficient capabilities to display on a "tiled" display used as an enlarged display with panels integrated, as well as on displays including ultra high-resolution panels.

Furthermore, even when video data is transferred in the form of packet between the host system side and the display side, it is possible to execute error handling effectively.

According to the present invention, it is possible to achieve the transfer of the image data from the host system side to the display side and the transfer thereof from the display side to the host system side with a high efficiency.

Moreover, even when the transfer error handling in transferring the video data is executed, the quantity of data transfer relating to the transfer error can be reduced.

Although the preferred embodiments of the present invention have been described in detail, it should be understood that various changes, substitutions and alternations can be made therein without departing from spirit and scope of the inventions as defined by the appended claims.

What is claimed is:

1. An interface method for transferring image data between a host system for executing an application and a display connected to the host system, comprising the steps of:

managing image data by the host system, belonging to a window in accordance with a sub-area obtained by dividing a display area of the display, for the window that is a display area in an image space of which the application is conscious;

transferring the image data managed by the host system as a packet unit to the display via the interface, wherein the packet unit comprises a header indicating that the packet unit corresponds to the window;

developing the image data, transferred to the display via the interface, in a panel memory of the display, and grasping conditions of a transfer error in the transferred image data in a unit of the window; and grasping by the host system the conditions grasped through the display, wherein a re-transfer of the image data from the host system to the display through the interface is executed based on the conditions of the transfer error grasped by the host system, and wherein the re-transfer of the image data is executed for a sub area in which the transfer error is grasped.

2. The interface method according to claim 1, wherein the re-transfer of the image data is executed for image data of all sub areas belonging to the window, and developing in the panel memory is again executed only for a sub area in which the transfer error occurred.

3. An image display system comprising:

a host system for executing an application;

a display for displaying an image, the display being connected to the host system; and an interface for connecting the host system and the display to each other, wherein the interface has a first interface for executing a transfer of a large capacity of data from the host system to the display and a second interface for executing a transfer of a small capacity of data from the display to the host system, which is not zero but smaller than the quantity of data transferred by the first interface.

4. The image display system according to claim 3, wherein the first interface transfers the data after packetizing the data, and the second interface transfers the data used for an error handling among the data transferred by the first interface.

5. The image display system according to claim 3, wherein the host system transfers image data before developing through the first interface, and the display includes a panel memory for developing the image data transferred through the first interface, and transfers information relating to a transfer error through the second interface, which occurred in transferring the image data developed in the panel memory.

6. The image display system according to claim 3, wherein the first interface includes a bi-directional high speed transfer line, and transfers the data in synchronization with high speed clock signals obtained by multiplying clock signals, and the second interface transfers the data in synchronization with clock signals which are not multiplied for the bi-directional high speed transfer line used for the first interface.

7. The image display system according to claim 3, wherein the first interface includes a uni-directional high speed transfer line, and the second interface includes a bi-directional low speed transfer line.

8. A host device connected to a display for displaying an image through an interface, comprising:

a system bus for receiving image data from an application executed; and transfer means for dividing the image data received through the system bus so that each of the divided image data corresponds to a corresponding sub area obtained by parceling a display area of the display, and for transferring each of the divided image data in the form of a packet comprising a header after packetizing each of the divided image data as a unit, wherein the header includes information for identifying whether the packet indicates a re-transfer for transferring the image data again.

9. The host device according to claim 8, wherein the system bus receives the image data in accordance with a window that is a region making sense collectively in an image space of which the application is conscious, and the transfer means transfers the image data to the display so that each of the divided image data corresponds to the corresponding sub area belonging to the window.

10. A host device which executes an application and is connected to a display for displaying an image through an interface, comprising:

image data transfer means for transferring image data to the display after packetizing the image data into a packet unit corresponding to a window that is a display area in an image space of which the application is conscious; wherein the packet unit comprises a header indicating that the packet unit corresponds to the window; and error condition receiving means for receiving error conditions with reference to the image data transferred to the display by the image data transfer means, in the form of a predetermined collective unit from the display, wherein the predetermined collective unit with which the error condition receiving means receives the error conditions is a unit of the window developed by the display.

11. The host device according to claim 10, wherein the image transfer means re-transfers the image data based on the error conditions received by the error condition receiving means.

12. An image display device comprising:

a panel for displaying an image;

receiving means for receiving image data through a first interface from a host system which executes an application, the first interface transferring a large quantity of image data; and notifying means for notifying information indicating a transfer error with respect to the image data received by the receiving means to the host system through a second interface transferring a smaller quantity of image data than the first interface.

13. The image display device according to claim 12, the image display device further comprising:

a panel memory for developing the image data received by the receiving means, wherein the notifying means notifies collectively the information relating to the transfer error in a unit with which a refreshment of the panel is performed using the image data developed in the panel memory.

14. The image display device according to claim 12, wherein the notifying means notifies information indicating the transfer error when a still picture is displayed in the panel, and does not notify the information indicating the transfer error when a moving picture is displayed in the panel.

15. An image display device comprising:

a panel for displaying an image;

receiving means for receiving image data packetized from a host system which executes an application;

a panel memory for developing the image data received by the receiving means; and transfer error notifying means for recognizing a transfer error with respect to the image data received by the receiving means, and for notifying information relating to the transfer error to the host system, the transfer error being recognized in a unit developed in the panel memory, wherein the transfer error notifying means comprises an identification information storing section for storing identification information of the image data which caused the transfer error and notifies the identification information stored in the identification information storing section to the host system.

16. The image display device according to claim 15, wherein the identification information storing section has error address registers for identifying a packet received and a pointer register indicating the number of the error address registers.

17. A display interface which transfers image data from a host system for executing an application to a display for executing an image display, comprising;
- variable-length packet data for transferring image data obtained by dividing an image space, of which the application is conscious, into a predetermined unit, the image data being packetized; and
- a control line for indicating a valid packet period in the variable-length packet data, wherein the control line uses an enable signal including predetermined bits in the interface for transferring the packet data.

18. A display interface which transfers image data for each sub area belonging to a window to a display, the image data being transferred after making the image data have a packet structure and the window being a region making sense collectively in an image space of which an application is conscious, wherein the packet structure comprises:
- a header portion including information indicating which window the packet belongs to;
- a body portion including image data belonging to the sub area for the display and information relating to an address of the sub area; and
- a footer portion including information for confirming a transfer error, wherein the footer portion has a bit array for confirming a transfer error.

19. The display interface according to claim 18, wherein the header portion includes information for identifying whether the packet indicates a re-transfer for transferring the image data again.

* * * * *